United States Patent Office 3,088,164
Patented May 7, 1963

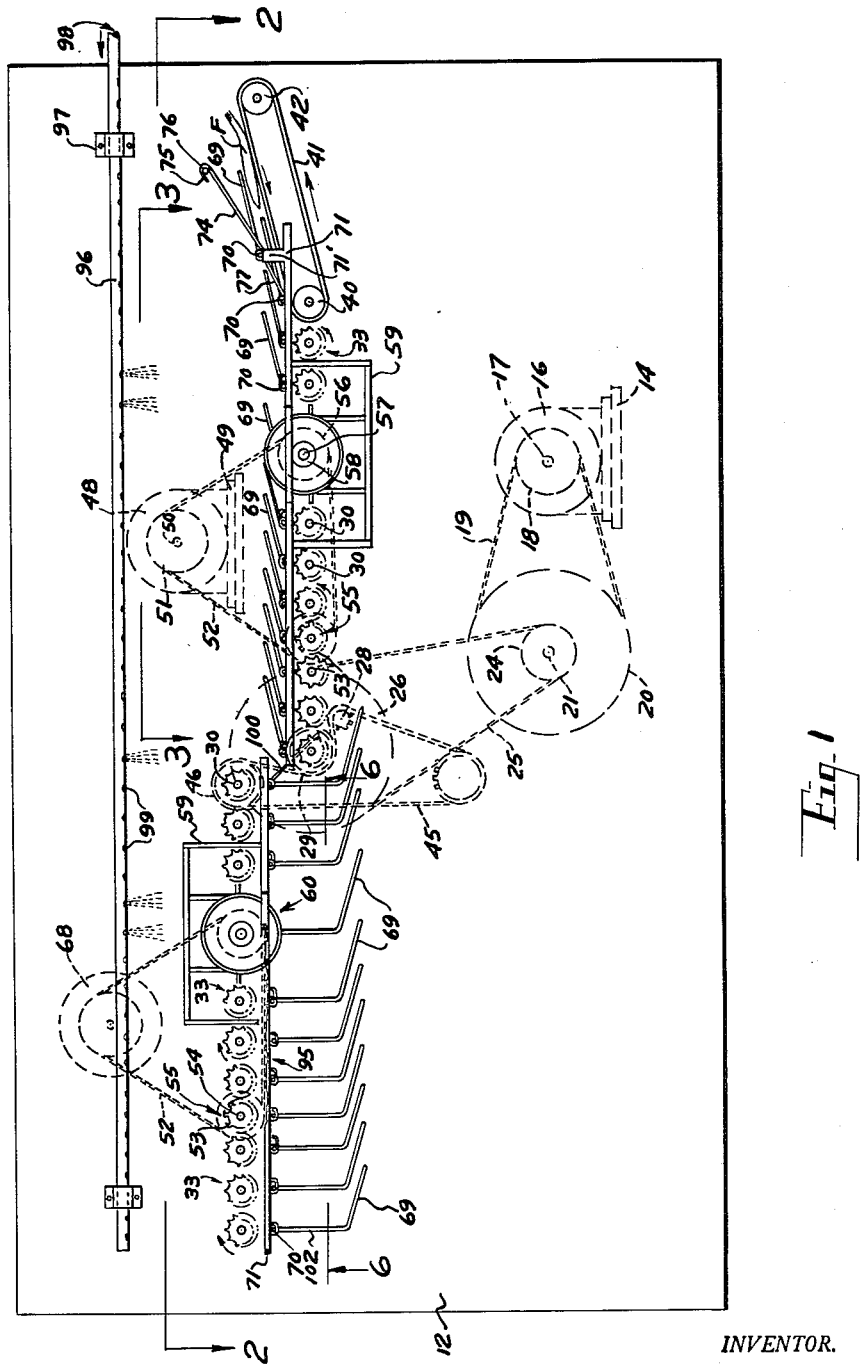

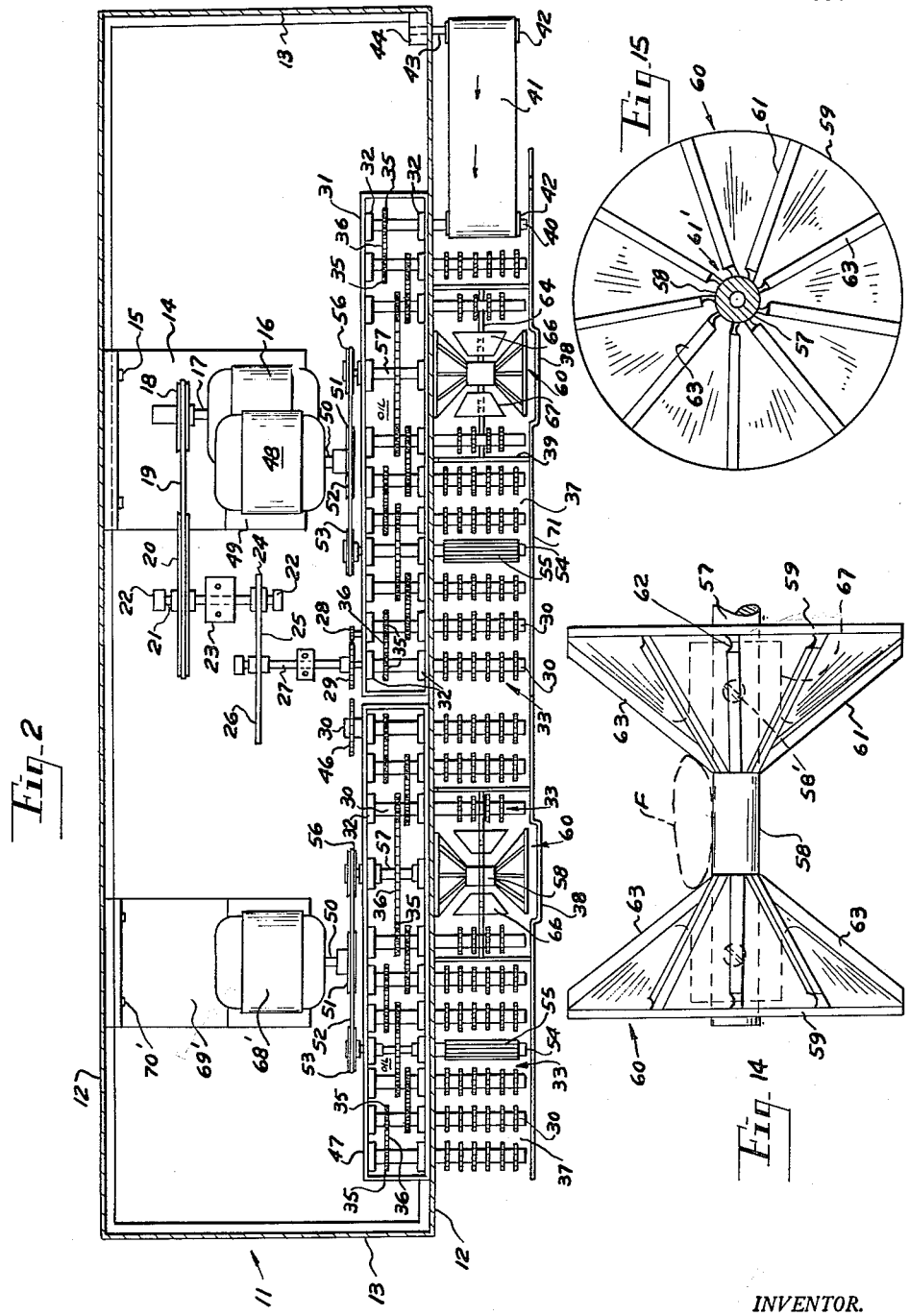

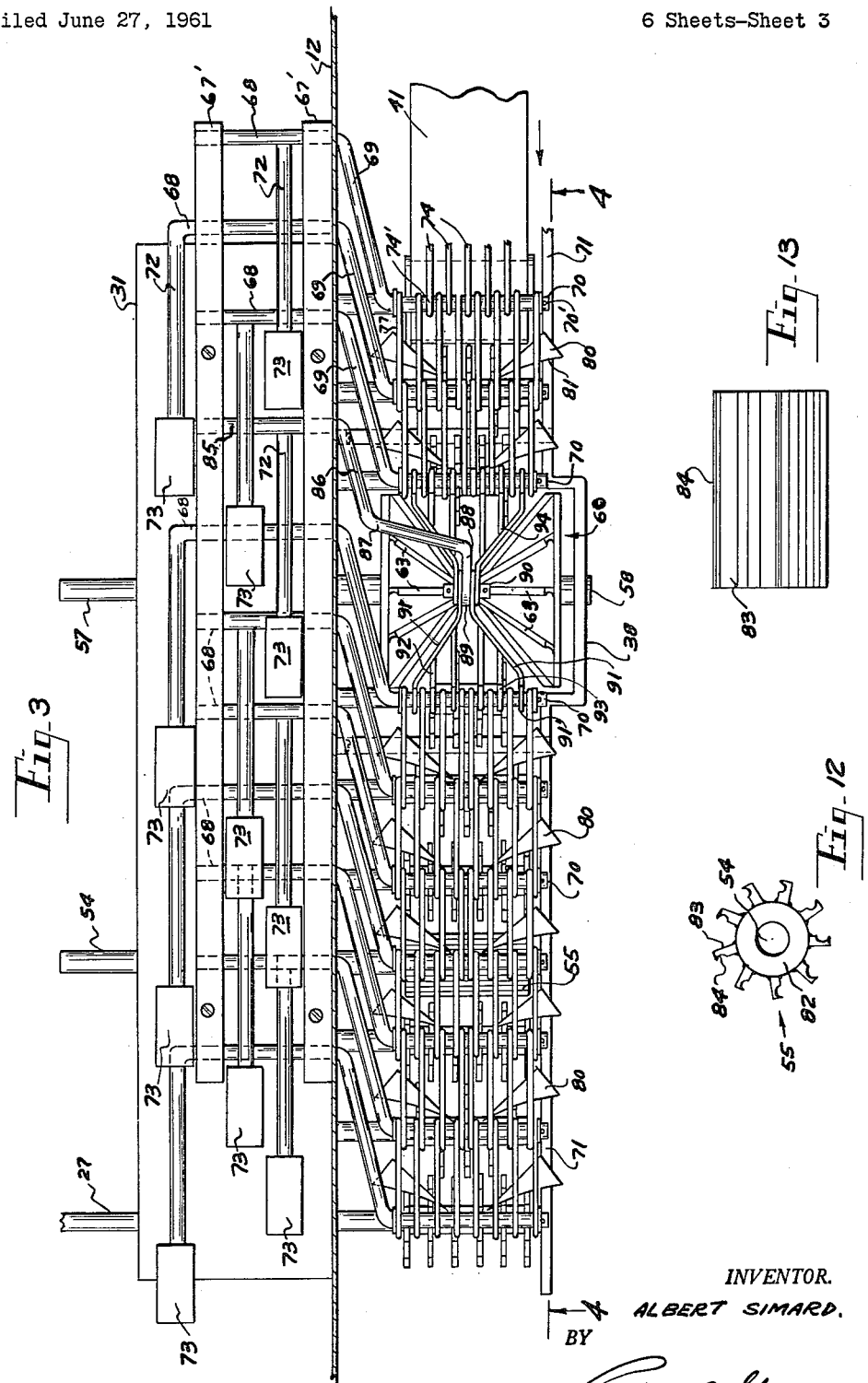

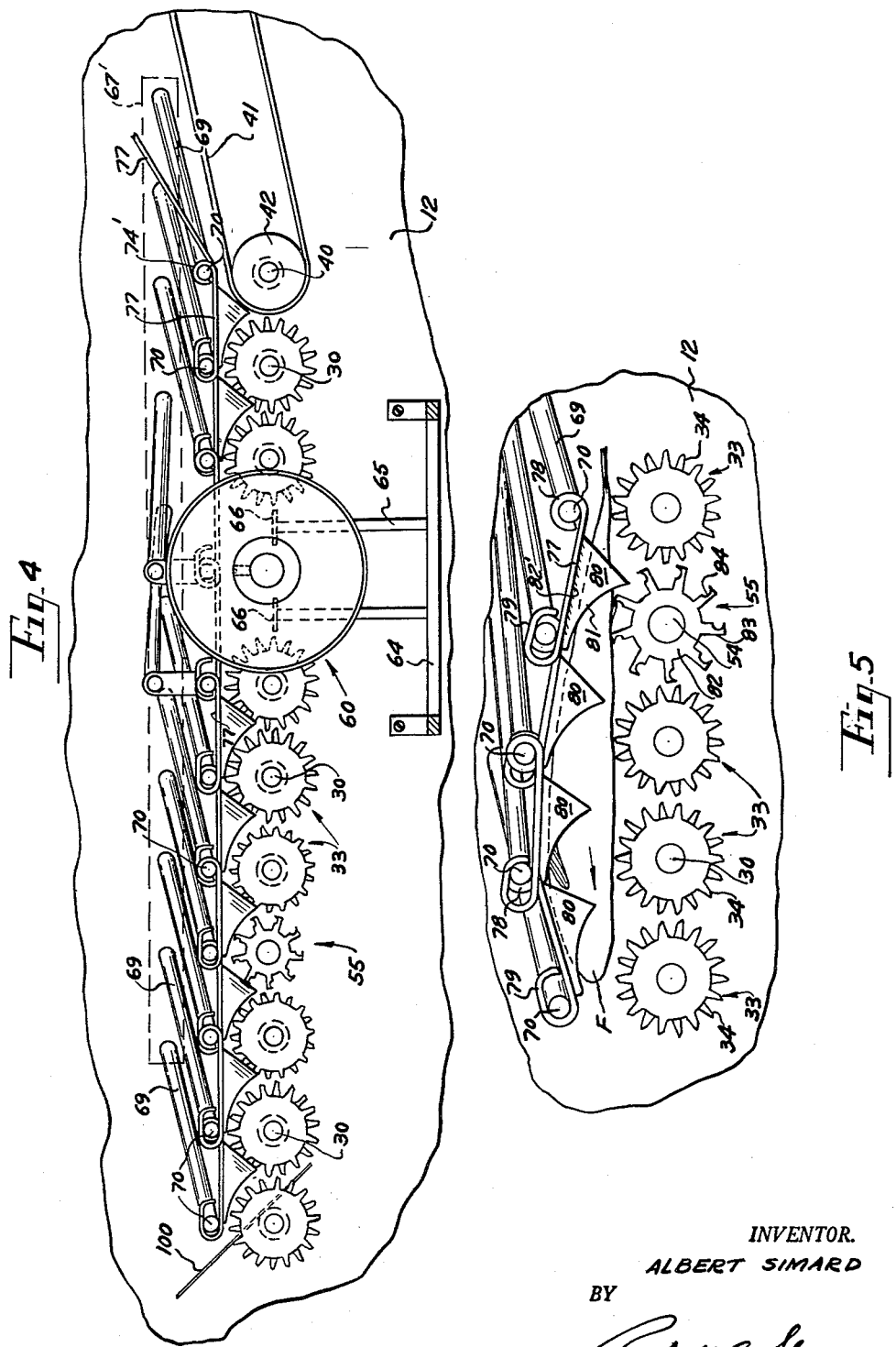

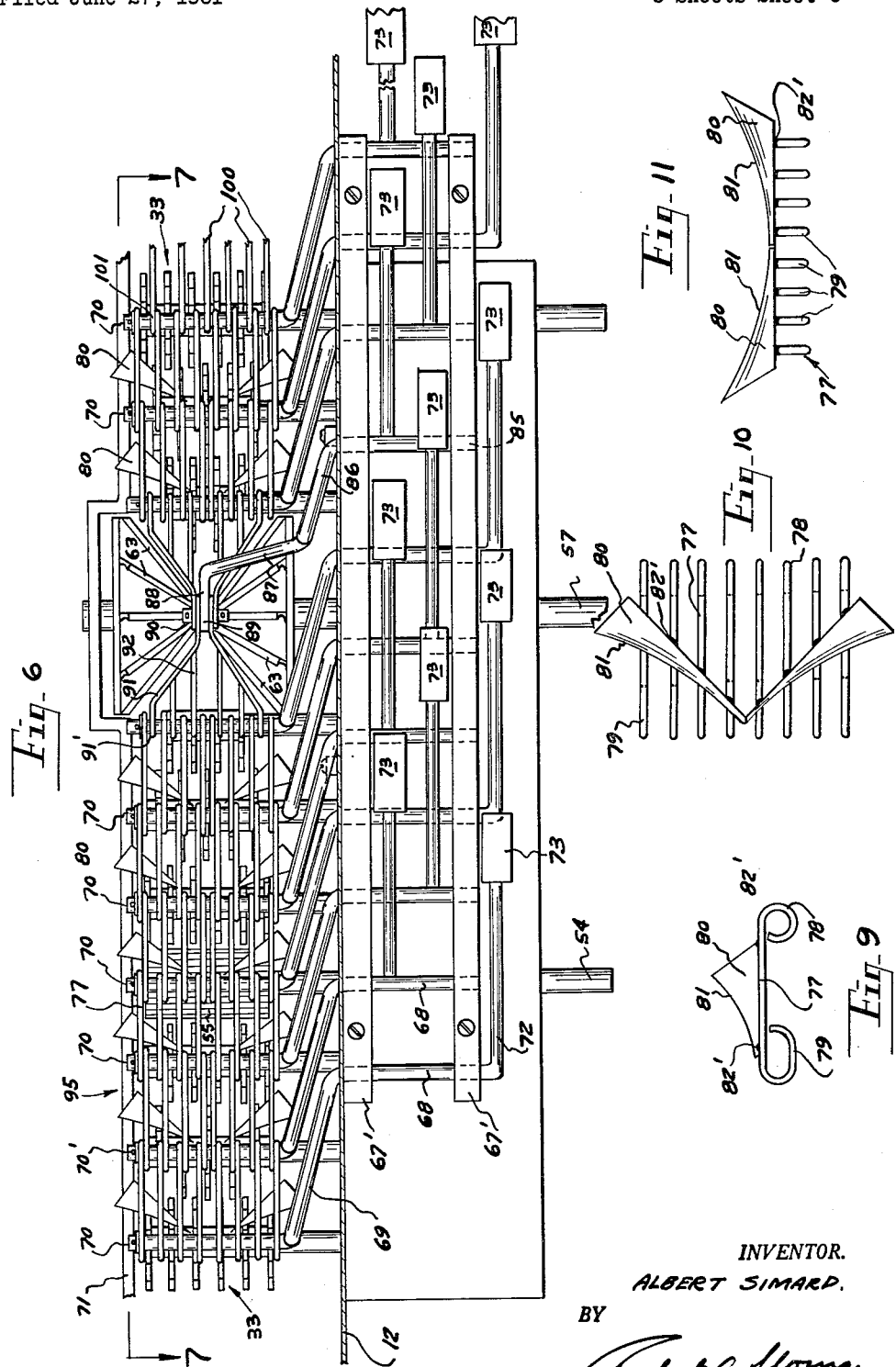

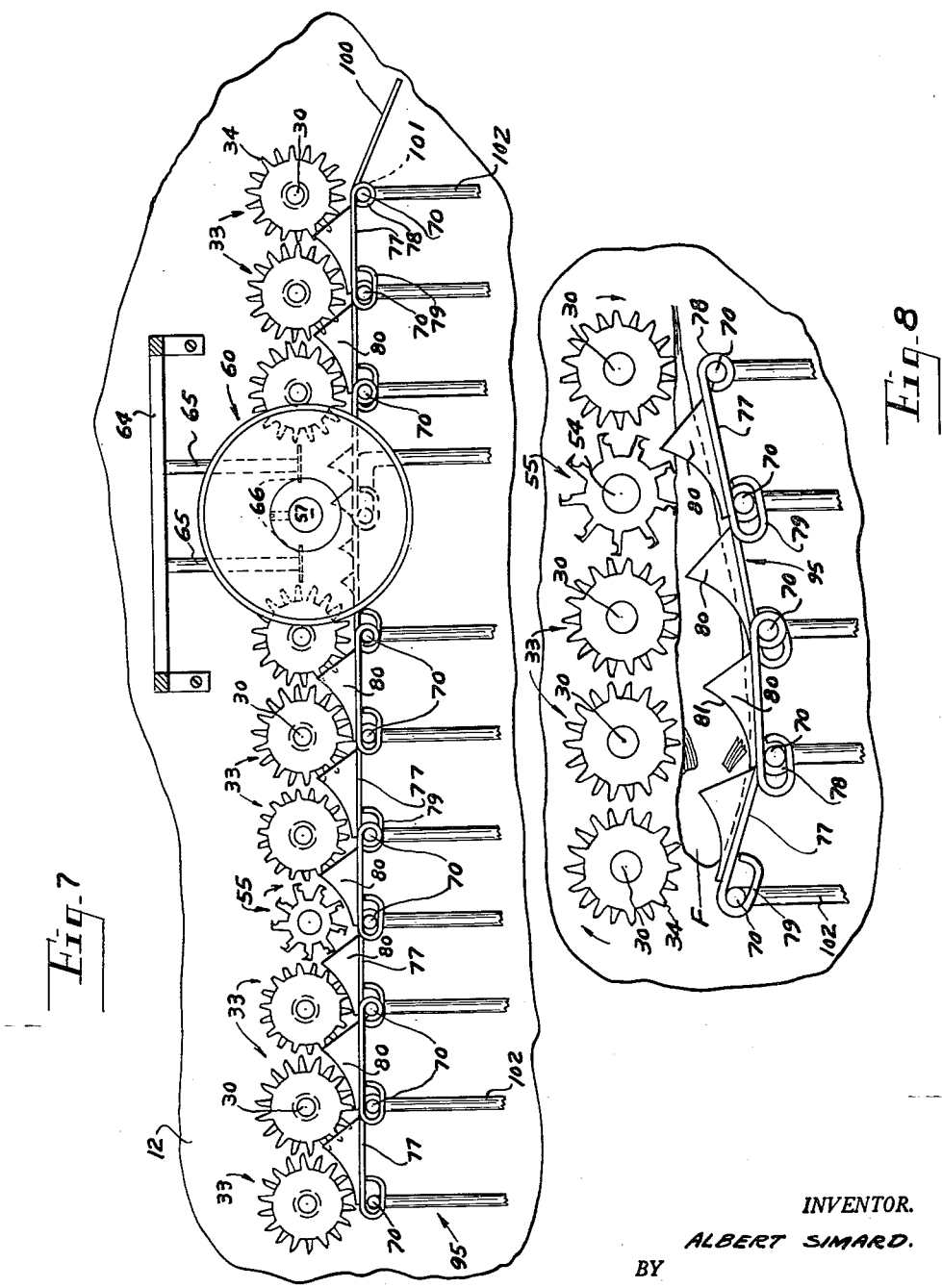

3,088,164
FISH SCALING MACHINE
Albert Simard, Sandwich, Windsor, Ontario, Canada, assignor of one-half to Frederick L. Moore, Sandwich, Ontario, Canada
Filed June 27, 1961, Ser. No. 119,993
7 Claims. (Cl. 17—5)

This invention relates to an automatic fish scaling machine, and more particularly to a device through which fish may be transported in a continuous operation for removing their scales.

Heretofore various complicated mechanisms have been provided on the market which have sought, though ineffectively, to accomplish the purpose of removing the scales efficiently. Various objections have arisen in these structures, primarily the fact that they are ineffective for the intended purpose, are cumbersome, easy to break down and inefficient.

It is the primary object of the present invention to provide an improved fish scaling machine wherein the fish is transported in a continuous movement and in a rectilinear direction for removing the scales from both sides of the fish as it is transported therethrough.

It is another object of the present invention to provide an improved machine with means for feeding the fish longitudinally therethrough and with a series of scale removing blades which are effective for removing the scales from the top and bottom surfaces of the fish and as well as the side portions thereof in a continuous operation.

It is another object of the present invention to provide a novel form of guide means and holddown device for the fish as it is transported through the machine.

It is another object of this invention to provide a novel form of power transmission means for controlling the feeding of the fish through the machine in a continuous operation, and during which opposite sides and all surfaces of the fish are descaled together with further power means for driving the descaling devices.

These and other objects will be seen from the following specification and claims in conjunction with the appended drawings in which:

FIG. 1 is a side elevational view of the fish descaling machine.

FIG. 2 is a section taken on line 2—2 of FIG. 1.

FIG. 3 is a section taken on line 3—3 of FIG. 1 on an increased scale.

FIG. 4 is a fragmentary section taken on line 4—4 of FIG. 3.

FIG. 5 is a fragmentary side elevational view corresponding to FIG. 1, and on an increased scale illustrating the construction of the guide means and holddown mechanism.

FIG. 6 is a fragmentary section taken on line 6—6 of FIG. 1 on an increased scale.

FIG. 7 is a fragmentary section on an enlarged scale, taken on line 7—7 of FIG. 6.

FIG. 8 is similar to FIG. 5 and is a fragmentary side elevational view corresponding to FIG. 1, on an increased scale, to illustrate the guide and holddown means at the left end of the descaling device shown in FIG. 1.

FIG. 9 is a side elevational view of a portion of the fish holddown webbing and guide means.

FIG. 10 is a plan thereof.

FIG. 11 is an end elevational view of the holddown and guide means shown in FIG. 10.

FIG. 12 is an end elevational view on an enlarged scale of one of the descaling rolls.

FIG. 13 is a side elevational view thereof.

FIG. 14 is an elevational view of one of the descaling wheels adapted for removing scales from side portions of the fish.

FIG. 15 is an end elevational view thereof.

It will be understood that the above drawings present merely a preferred embodiment of the invention as defining a fish descaling machine, and that other embodiments are contemplated within the scope of the claims hereafter set forth.

Referring to the drawing, the present fish scaling machine as shown in FIGS. 1 and 2 includes a housing generally indicated at 11 with opposed front and rear walls 12 and opposed upright end walls 13.

Platform 14, secured at 15, to rear wall 12, mounts the motor 16 whose driveshaft 17 and pulley 18 through belt 19 operates driven pulley 20.

Pulley 20 is mounted on shaft 21—22, journaled at 23 for the driving of the pulley 24 which through belt 25 operates pulley 26 on shaft 27, suitably journaled and supported within the framework of the housing 11.

Power driven shaft 27 carries the sprocket 29, FIG. 1, which through the sprocket chain 45 and idler sprocket 28 drives sprocket wheel 46 on shaft 30, FIG. 2. Shaft 27 also drives shaft 30 which is journaled and supported in a horizontal plane through the transmission housing 31, FIG. 2, with suitable retaining bearings 32 thereon, and which projects through the front wall 12 of housing 11 and has mounted secured thereon a series of longitudinally spaced feed wheels 33, having a series of tapered or pointed segments 34, which define, as hereinafter described, the conveyor means for the fish as transported through the machine.

As shown in FIG. 2, there are a series of parallel spaced horizontally disposed shafts 30, all of which are journaled within the transmission housing 31 and which project through the front wall 12 of housing 11 and each of which carries thereon a series of longitudinally spaced feed wheels 33.

The first mentioned shaft 30 is suitably interconnected with each of the other shafts 30 by means of a series of sprocket gears 35 and corresponding chains 36, and by which it is seen that the first shaft 30 above mentioned drives the second shaft 30, which in turn drives the third shaft and so forth. Accordingly, the motor 16 is effective for continuous rotation in the same direction of each of the conveyor shafts 30 upon which are the series of longitudinally spaced feed wheels 33—34, of the right hand conveyor.

All of the said feed wheels 33 are disposed within a chamber 37 defined by the upright guide partition 38, anchored at 39 to the front wall of the housing.

As best shown in FIGS. 1 and 2, conveyor belt 41 is arranged at the right end of the housing and is guided around the respective rollers 42, one of which is secured to the shaft 40, which corresponding to the other shafts 30 is likewise driven by motor 16 through a similar set of sprockets 35 and chain 36, as best shown in FIG. 2.

The upper end of the conveyor belt 41 is supported upon the roller 42, which is journaled upon the forwardly projecting shaft 43 anchored at 44 within the housing.

The fish normally are loaded upon the belt 41 one at a time in substantial longitudinal alignment and they move downwardly, as shown in FIG. 1 for entering into and upon the conveying wheels 33 for transmission through the machine and for the purpose of removing the scales.

FIG. 4, being a section taken on line 4—4 of FIG. 3, indicates a conveyor system for the fish for moving the same longitudinally through the right side portion of the machine, as viewed in FIGS. 1 and 2.

The same power mechanism, namely the motor 16 and transmission above described directs rotative power to the sprocket 29, also through the connected sprocket chain 45 drives the sprocket wheel 46 on the shaft 30 projected through and journaled upon the secondary transmission housing 47, which is of a construction practically the same as that above described with transmission housing 31.

The shaft 30, within the transmission housing 47, is journaled therethrough with corresponding bearings 32 thereon and which projects through the front wall of the housing 12 and carries at its outer end portion within the chamber 37 an additional series of longitudinally spaced feed wheels 33, as above described. Here also, a series of sprockets 35 and interconnecting chains 36 provide a means of transmitting rotative power to each of the additional sets of longitudinally spaced outwardly projecting shafts 30 which are journaled and supported within the transmission housing 47, and which project through the front wall of the housing 12 for the purpose of supporting a series of additional feed wheels 33.

Accordingly, it is seen that the single motor 16 provides the drive for all of the feed shafts 30, as well as the feed shaft 40, which controls the conveyor belt 41, shown in FIGS. 1 and 2.

Referring again to FIGS. 1 and 2, the second motor 48, supported at 49 has a driveshaft 50 carrying a pulley 51 for transmitting motion to the belt 52, in turn driving the pulley 53 secured on shaft 54, which projects through and is journaled within the transmission housing 31 and which extends through the wall 12 and has secured or keyed thereto the descaler roll 55, shown on an increased scale in FIGS. 12 and 13.

As shown in FIGS. 1 and 2, the said descaler roll 55 is interposed between and substantially coplanar with an adjacent pair of feed shafts 30 and the feed wheels 33 thereon. Accordingly as the fish is transported horizontally to the left, as in FIGS. 2 or 1, the said descaler roll 55, as best shown in FIG. 5 is power driven for the effective removal of the scales from the fish, as it is transported thereover—the said fish being generally indicated by the letter F, in FIG. 5.

The fish as it is transported over the conveyor means 33 is held down thereon by a webbing hereinafter described so as to assure that the undersurface of the fish is descaled as it is transported over the said scaling roll 55.

The above described feed belt or sprocket chain, as the case may be, namely element 52, also is in driving connection with the pulley 56 on the shaft 57 also journaled through the transmission housing 31 and projecting through the wall 12 into the chamber 37 on the exterior of said housing.

A tapered scaler roll, generally indicated at 60, suitably secured or keyed through its hub 58, as at 58' upon the shaft 57 and is so arranged as shown in FIG. 14, as to receive and operatively engage on the opposed side portions of the fish as it is transported by the feed mechanism of the machine.

The tapered roll 60, also shown in FIG. 15, has a pair of spaced annular rims 59, as well as an internal hub 67. There are arranged extending inwardly from each of the rims 59 a series of inclined elongated blades 63 fixedly secured at their outer ends as at 62 to the rim 59 and fixedly secured at their inner ends, as at 61', FIG. 15 to the hub portion 58 to thus provide, as above mentioned, a tapered descaling wheel generally indicated at 60.

Accordingly the motor 48, which drives the descaling roll 55 also drives through the belt 52 or sprocket chain, the descaling tapered wheel 60. This means that as the fish are transported longitudinally over the conveyor means 33 and employing the holddown means hereafter described, they are transported over the tapered roll 60, which initially removes the scales from the opposing side portions of the fish for the lower half thereof, after which the fish is transported over the scaling roll 55 which removes the scales from its bottom portion.

It is accordingly noted that for the right hand half portion of the machine shown in FIGS. 1 and 2, and also shown in FIG. 5, a fish is conveyed longitudinally through the machine from its undersurface through the series of feed wheels 33—34. Now, in order to remove these scales from the opposite side of the fish, there is an additional feed mechanism corresponding to the second transmission housing 47 by which the fish is driven from its upper surface, as in FIG. 8 by an additional series of feed wheels 33, and wherein the holddown means actually engages the fish from its undersurface holding the same against the corresponding tapered roll 60 and descaler roll 55, shown in FIG. 2 at the left end of the figure.

Referring to FIG. 14, a tapered descaler roll 60 includes the series of angularly inward extending blades 63, whose outer edges are sharp at 61 for the purpose of operatively engaging the side portions of the fish, as shown in FIG. 14, which side portions correspond to the undersurface portion also of the fish.

As the fish is transported successively to the left side of the scaler machine, there is shown in FIG. 2 a second tapered descaler roll 60, which is now arranged above the fish, and accordingly is adapted to remove the tapered side portions of the fish corresponding to the top surface thereof. Likewise, the descaler roll 55 is arranged above the fish as it is transported thereunder as in FIG. 8 to thus remove the scales from the upper surface of the fish completing the operation, with the descaled fish delivered at the left side, or left end of the conveyor system shown in FIG. 2.

In view of the tapered character of the descaler roll 60, as shown in FIG. 2, as the fish is transported transversely therethrough, means are provided for preventing the fish from dropping and for continuing over the conveyor rolls 33. For this purpose there is provided, as best shown in FIGS. 2 and 4, a support 64, secured upon the wall of the housing as at 12, carrying a pair of upright arms 65 with support plates 66 at their upper ends, whose tapered edges correspond to the taper of the taper roll 60, shown in FIG. 2 to thus provide a support by which the fish is transported over the tapered roll and on to the succeeding feed wheels 33.

An additional support arrangement such as this is also shown in connection with the left hand tapered roll 60. Here, though, as shown better in FIG. 7, the support plates 66 on the arms 65 are on their lower ends inasmuch as the fish is supported from its undersurface by the webbing hereafter to be described.

It is noted that each case, as shown in FIG. 2, the support plates 66 have tapered edges 67 which correspond substantially to the taper or inclination of the blades 61—63, which form a part of the tapered scaling roll 60.

In conjunction with the scaler rolls 55 and 60 at the left side of the machine shown in FIG. 2, there is however, provided an additional motor 68' on the support 69' anchored at 70' within housing 11 whose driveshaft 50 corresponding to the driveshaft 50 of motor 48 is adapted through the pulleys 51, 53 and 56, as well as the corresponding belt 52 for the purpose of driving the descaler rolls 55 and 60 in a manner and in a method of operation exactly the same as above described in conjunction with the first mentioned rolls 55—60 at the right end of FIG. 2.

During the descaling operation, means are employed for holding the fish yieldingly against the descaler rollers as it is fed longitudinally by the series of feed wheels 33. For this purpose, there is provided a novel holddown structure in the nature of a yielding flexible webbing.

Referring to FIGS. 1, 3, 4 and 5, a pair of parallel spaced support bars 67' are mounted upon the interior of housing 11 adjacent the wall 12, as best shown in FIG. 3, through which are arranged a series of longitudinally spaced transverse pairs of bores adapted to receive the elongated rotative shafts 68. For illustration, one of such shafts is described in connection with FIG. 3, being the right hand shaft, which extends through the front wall 12 of the housing, has an inclined portion 69, which terminates in the outwardly extending support rod 70 parallel to the main body 68, and whose outer end rests upon the guide rail 71, as shown in FIG. 1, and which is mounted upon a portion of the housing inwardly of the framework 38, shown in FIG. 2.

Referring again to FIG. 3, there is provided an elongated shaft 72 which is secured to the shaft 68 and extends at right angles thereto and at its end mounts a weight 73, which is normally biasing the shaft 68, and causing a corresponding tendency to rotate the support 70 in a counterclockwise direction relative to the journal mounting of the rod 68.

It is noted that there are a series of such shafts 68 in longitudinally spaced relation journaled within the respective supports 67' and which project through the front wall 12 of the housing and have inclined portions corresponding to portion 69 all of which terminate in the elongated parallel support rods 70 which form a portion of the holddown webbing, now described.

The construction of the various shafts 68, which form a part of the webbing is slightly different only because of the necessity for providing a location for each of the biasing weights 73 attached to the respective shafts so that they all will have a downward bias, at least as to the right end of FIG. 1.

At the end of the conveyor assembly, directly above the lower end of the belt 41, there are first a series of downwardly inclined straps or bars 74, whose lower ends are looped as at 74' to extend around the first of the shafts 70 at the right end of FIG. 3. This first mentioned shaft 70 rests upon the extension 71' on the support rail 71. The upper end portions of the inclined straps 74 arranged in parallel relation, include reverse curved loops 75, which receive a transverse shaft 76 which extends to and is supported upon the side wall 12, as shown in FIG. 1. Thus the fish as it moves down the conveyor belt 41 will initially engage the undersurfaces of the straps 74 whose lower ends are normally biased downwardly as by the support shaft 70, above described, causing a slight elevation of the said lower ends of the straps 74 and the corresponding rod 70 against the action of the weight 73.

Arranged upon the opposite side of the shaft 70 as shown in FIGS. 3 and 5, are an additional series of parallel spaced transversely arranged links or straps 77 with reverse curved ends 78 additionally looped around the shaft 70 with suitable spacers interposed. The opposite ends of the respective straps 77 have also elongated reverse curved loops 79, which loosely receive the next successive shaft 70, which shaft also is continuously biased downwardly by its corresponding weight 73, shown in FIG. 3.

As shown in the drawing, there are a series of such support shafts 70, each of which include the inclined portions 69 terminating in the rearwardly extending supporting shaft member 68 all journaled and supported within the support bars 67'. This construction, and the flexible character thereof for the said webbing is best illustrated in FIG. 5, wherein it is seen that as the fish F is moved by the conveyor wheels 33, the corresponding support rods 70 are elevated in spite of their downward bias due to the weight 73 so that in effect the weights are effective for urging the webbing against the upper surface of the fish, and the fish in turn cooperatively bears against the descaler roll 55 and the conveyor elements 33.

The set of links or straps 77 at their right ends extend around the elevated shaft 70, being the first mentioned shaft at the extreme right, FIG. 1, whereas their opposite ends as at 79 loosely extend around the next adjacent shaft 70.

This linkage is continued with parallel spaced supporting straps 77 interconnecting loosely the adjacent support rods 70, as best shown in FIG. 3, which corresponds to the right end of the structure shown in FIG. 2. A slightly different form of webbing arrangement is shown as flexibly overlying the tapered descaler wheel 60. Here the links are of a different shape and the support shaft 85 is of a slightly different form.

The inner end of the shaft is rotatively journaled between the supports 67' and projects through the wall 12 of the housing terminating in the inclined portion 86 and the additionally inclined portion 87, which terminates in the longitudinally extending support 88, which is looped at 89 to receive the transverse rod 90. The shaft 85 also has a right angularly related supporting arm 72 terminating in the weight 73 so that the looped end 89 of said shaft 85, 86, 87 and 88 is biased downwardly. There are a series of angular straps or links 91, which are looped at their one ends or inner ends to extend over the central shaft 90, and at their opposite ends are looped as at 91' for positioning over the corresponding supports 70, as shown in FIG. 3.

There are a series of additional short links 92, which are looped as at 93 over the adjacent support rod 70 in parallel spaced relation and whose inner ends are connected as at 94 to the inclined straps 91 respectively. Accordingly, with respect to the tapered descaling wheel 60 there is also a holddown webbing under which the fish travels as it moves along the conveyor assembly 33.

In accordance with the present invention, the fish as it is transported by the conveyor wheels 33, is centered with respect thereto by means of the opposed pairs of angularly arranged irregularly shaped guides 80. These pairs of tapered inclined guides with inwardly extending, slightly curved guide edges 81 extend centrally towards the central portion of the conveyor assembly for cooperative engagement with the body of the fish, but for the purpose of centrally guiding the fish over the conveyor rolls.

The structure of the guide 80 is best shown in FIGS. 9, 10 and 11. Here, as hereafter described, the guides 80 are on the upper surface of the supporting webbing rather than the undersurface, urging the fish upwardly as best shown at the left side of FIG. 1. However, for purposes of explanation, it is seen from FIGURES 9 through 11 that the tapered and angular guide members 80 are anchored as by welds 82' to the respective corresponding parallel spaced straps 77, which they span angularly as best shown in FIGS. 10 and 11.

This is particularly important so that for the scaling operation the fish will be centered with respect to the tapered descaler roll 60 shown in FIG. 14, so that the side undersurface portions of the fish may be descaled.

As the fish moves below the first tapered descaler 60, as conveyed by the conveying mechanism 33, it progresses so as to overlie transversely the descaler roll 55, FIGS. 1, 2 and 3, which consists of a series of radially extending transversely elongated plates 83, extending from a central body 82, and terminating in the arcuate sharpened scale removing elements 84, best shown in FIG. 5.

It is contemplated as a part of the present invention that the speed of rotation of the descaler roll 55 is greater than the longitudinal movement of the fish F along the conveyor elements 33, inasmuch as it is noted that the descaler roll 55 is rotating in a counterclockwise direction corresponding to the direction of movement of the fish to the left of FIG. 5.

As the fish traverses over the conveyor elements, it is seen that the webbing is flexibly biased downwardly at all times relative to the fish, as best shown in FIG. 5, and due to the respective weights 73 on the corresponding shafts 68 and 85, so as to urge the fish against the conveyor elements 33 and accordingly the descaler rolls 60 and 55.

As the fish travels over the conveyor elements, the respective sets of guides centralize the fish at all times and to maintain the same centrally with respect to the conveyor wheels 33.

As the fish move in succession longitudinally over the right hand set of conveyors of FIG. 1, the undersurface of the fish, as well as the opposed underside portions thereof are descaled. As the fish leaves the first set of conveyors, shown in FIG. 1, and also shown in FIG. 4, it is now moved under and with respect to the second set of conveyors shown in FIGS. 7 and 8 and wherein it is noted also that the tapered descaler roll 60, as well as the descaler roll 55 are interposed coaxially with a conveyor element 33 of the said second conveyor, FIG. 7, so that the descaling operation occurs now on the top side of the fish as well as the top side edge portions thereof to complete the scaling operation.

For this purpose, it is noted that the second set of conveyors 33 corresponding to the left of FIG. 1 extend from the end of the first set of conveyors and are displaced vertically with respect thereto. At the same time there is employed a very similar wire mesh construction, generally indicated at 95, FIG. 7 which is designed at all times to bias the fish upwardly against the undersurface portions of the respective conveyor elements 33 and the descaler rolls 55 and 60.

The construction of the upwardly biasing mesh 95 is substantially the same as above described with respect to the first set of conveyors, and there are employed an additional series of support shafts 70, as shown in the bottom plan view of FIG. 6, which includes depending portions 102 terminating in the angular portion 69, the support rod 68, parallel to the element 70 journaled through the supports 67', shown in FIG. 6.

These rods 68 also include the right angularly arranged arms 72 carrying respective weights 73 to thus achieve a constant bias in an upward direction for the respective shaft 70.

As shown in FIG. 1, FIG. 4 and FIGS. 6 and 7, as the succession of fish move past the end of the first conveyor shown at the right hand side of FIG. 1, it engages the series of parallel longitudinally extending straps 100, which are inclined upwardly, being looped at their upper ends at 101, FIG. 7, and pivotally supported upon the support shaft 70, which forms a part of the upward bias webbing 95, FIG. 7.

The purpose of the set of straps 100 is to initially depress downwardly the webbing 95 to guidably receive the fish F, as shown in FIG. 8 so as to be positioned on the undersurface of the conveyor elements 33 and the descaler rolls 55 and 60, as best shown in FIG. 8.

The operation is exactly the same as above described with respect to the webbing conjunction with the first described conveyor at the right end of FIG. 1, except that the webbing 95 is generally biased upwardly so as to maintain the fish in contact with the conveyor elements 33, as well as the corresponding scaler rolls 55 and 60 forming a part of the second conveyor assembly on the left side of FIG. 1.

The full description of the webbing is omitted, being exactly the same as above described with respect to the first conveyor element and wherein each of the support shafts 70 is biased actually for movement in a clockwise direction, viewing FIG. 1, due to the set of weights 73, which are shown in the bottom plan view of FIG. 7, which is taken on line 6—6 of FIG. 1.

During the scaling operation, the elongated water pipe 96, mounted upon the front wall 12 of the housing as at 97, provides a spray of water as at 99, down over the respective conveyors washing down the scales from the conveyor elements and the descaling rolls to thus complete the construction of the descaling machine.

One advantage of the present construction is that the fish in succession move longitudinally through the machine wherein first the undersurface and side portions of the fish are descaled after which, and with respect to the second conveyor, the upper surface and corresponding side portions are descaled and with the fish leaving the second conveyor at the left end as in FIG. 1 completely descaled and ready for use.

While a series of weights 73 are shown on the ends of arms 72 extending at right angles to the respective shafts 68 and 85, in the embodiment described, it is contemplated that the biasing achieved by the said weights can just as well be accomplished by a series of coiled springs connected to the shafts 72 for the same effect.

It is contemplated that the springs could replace the weights to thus reduce the bulkiness of the present construction, if desired. Any other resilient means could be employed.

All of the power mechanism, including the motors, transmissions, gearing, etc., are completely enclosed and waterproof. The water supply is on the exterior of the housing, as in FIG. 1, and thus and in view of the enclosure of the above mechanism, moisture is prevented from entry into any of the power mechanism. It is seen that the water is limited to the conveyor mechanisms, the scaling wheels or rollers, the webbing and the fish with the water and removed scales draining from the bottom of the machine to a suitable disposal mechanism.

The transmission mechanisms are completely enclosed, and include an oil bath in which the sprocket chains and gears operate with the result that wear and friction are reduced to a minimum. The construction of the transmission assemblies is such that repair or replacement of parts may be achieved without completely dismantling the machine. While only one scaler roller 55, is shown for illustration, in each of the conveyors of the machine, it is contemplated that two or more could be employed.

Having thus described the invention, reference should now be had to the following claims.

I claim:

1. A fish scaling machine, comprising a housing; a horizontally disposed first conveyer on said housing adapted to supportably receive a fish longitudinally movable thereover; a continuous substantially horizontal flexible web on said housing overlying said conveyor, biased downwardly against a fish movable between said conveyor and web;

a horizontally disposed second conveyor on said housing in longitudinal registry with the end of the first conveyor and displaced upwardly thereof adapted to supportably receive a fish longitudinally movable thereunder;

a continuous substantially horizontal flexible web on said housing underlying said second conveyor biased upwardly against a fish movable between the second conveyor and adjacent web;

a power driven descaler roller transversely interposed intermediate the ends of each conveyor operatively registerable with the longitudinal top and bottom surfaces of said fish respectively, a power driven oppositely tapered descaler interposed intermediate the ends of each conveyor operatively registerable respectively with the longitudinally opposed top and bottom side portions of the fish, and opposed pairs of tapered inwardly converging forwardly extending conveyor guides secured in longitudinally spaced relation to the respective upper and lower surfaces of the webs corresponding to said first and second conveyors restraining the fish to a longitudinal path centrally of said conveyors.

2. In the scaling machine of claim 1, said conveyors each including a series of parallel longitudinally spaced driven shafts journaled on said housing extending at right angles to its length, and a plurality of longitudinally spaced toothed feed wheels on each shaft, said descaler rollers and tapered rollers positioned between and parallel to said driven shafts and registerable with the top, bottom and side portions of the fish, as it traverses the length of said conveyors.

3. In the scaling machine of claim 1, said tapered descaler rollers each including an axial hub, a pair of parallel transverse outer rims, and a series of elongated cutting blades diagonally positioned relative to said conveyors, at their one ends secured respectively to said rims, inclined axially and at their inner ends respectively secured to said hub.

4. In the scaling machine of claim 1, said webs each including a series of parallel spaced support shafts extending transversely of the length of said conveyors, a series of laterally extending parallel spaced straps at their opposite ends looped over an adjacent pair of support shafts, a mounting shaft for each of said support shafts parallel thereto and eccentrically joined to said support shaft, journaled and supported on said housing, and weights eccentrically mounted on each of said mounting shafts for effecting respective downward and upward biases to said webs.

5. In the scaling machine of claim 1, said tapered descaler rollers each including an axial hub, a pair of parallel transverse outer rims, and a series of elongated cutting blades diagonally positioned relative to said conveyors, at their one ends secured respectively to said rims, inclined axially and at their inner ends respectively secured to said hub, a pair of oppositely tapered, horizontally disposed support plates spaced within open portions of the tapered descaler roll in substantial registry with its horizontal axis defining a continuation of the corresponding conveyor.

6. In the scaling machine of claim 1, said webs each including a series of parallel spaced support shafts extending transversely of the length of said conveyors, a series of laterally extending parallel spaced straps at their opposite ends looped over an adjacent pair of support shafts, a mounting shaft for each of said support shafts parallel thereto and eccentrically joined to said support shaft, journaled and supported on said housing, biasing means eccentrically mounted on each of said mounting shafts for effecting respective downward and upward biases to said webs, said webs each including in registry with said tapered descalers, a support shaft spaced from the axis of rotation of said tapered roller axially of a central portion of said conveyors longitudinally thereof, a mounting shaft eccentrically connected to said support shaft and journaled on said housing, biasing means eccentrically joined to said mounting shaft, pairs of inclined straps at their inner corresponding ends looped over said latter support shaft and at their outer ends looped over adjacent support shafts, and a series of parallel spaced bridging straps at their one ends looped over adjacent support shafts and at their other ends secured to said inclined straps.

7. In the scaling machine of claim 1, said webs each including a series of parallel spaced support shafts extending transversely of the length of said conveyors, a series of laterally extending parallel spaced straps at their opposite ends looped over an adjacent pair of support shafts, a mounting shaft for each of said support shafts parallel thereto and eccentrically joined to said support shaft, journaled and supported on said housing, and biasing means eccentrically connected to each of said mounting shafts for effecting respective downward and upward biases to said webs.

References Cited in the file of this patent
UNITED STATES PATENTS

| | | |
|---|---|---|
| 1,294,140 | Montgomery | Feb. 11, 1919 |
| 2,086,159 | Godfrey | July 6, 1937 |
| 2,664,591 | Brophy | Jan. 5, 1954 |
| 2,702,922 | Thibodeau | Mar. 1, 1955 |
| 2,795,812 | Godfrey | June 18, 1957 |